United States Patent
Katayama et al.

(10) Patent No.: US 10,542,095 B2
(45) Date of Patent: Jan. 21, 2020

(54) SYNCHRONIZATION MEASUREMENT SYSTEM, SYNCHRONIZATION MEASUREMENT METHOD, CONTROLLER, SENSOR UNIT, SYNCHRONOUS SIGNAL GENERATION UNIT, SYNCHRONOUS SIGNAL TRANSFER UNIT, AND PROGRAM

(71) Applicant: Seiko Epson Corporation, Tokyo (JP)

(72) Inventors: Takao Katayama, Matsumoto (JP); Mikimoto Jin, Chino (JP)

(73) Assignee: Seiko Epson Corporation (JP)

( * ) Notice: Subject to any disclaimer, the term of this patent is extended or adjusted under 35 U.S.C. 154(b) by 497 days.

(21) Appl. No.: 15/138,514

(22) Filed: Apr. 26, 2016

(65) Prior Publication Data

US 2016/0330278 A1   Nov. 10, 2016

(30) Foreign Application Priority Data

May 7, 2015   (JP) ................. 2015-094662

(51) Int. Cl.
*H04L 29/08* (2006.01)

(52) U.S. Cl.
CPC .................... *H04L 67/12* (2013.01)

(58) Field of Classification Search
CPC .... H04L 67/12; H04L 67/2823; H04L 67/125
See application file for complete search history.

(56) References Cited

U.S. PATENT DOCUMENTS

| | | | |
|---|---|---|---|
| 4,603,352 A | 7/1986 | Kaneta et al. | |
| 8,536,988 B2 * | 9/2013 | Ritter | H04W 88/04 340/286.02 |
| 2003/0016128 A1 * | 1/2003 | Lutz | G08C 19/00 340/517 |
| 2003/0050454 A1 * | 3/2003 | Cook | C07H 19/06 536/23.1 |
| 2004/0028023 A1 * | 2/2004 | Mandhyan | G01D 21/00 370/351 |
| 2007/0291777 A1 * | 12/2007 | Jamieson | G01D 5/00 370/401 |
| 2008/0252445 A1 * | 10/2008 | Kolen | G08B 21/0446 340/539.16 |
| 2011/0317517 A1 * | 12/2011 | Borresen | G01V 1/3808 367/21 |
| 2012/0283992 A1 * | 11/2012 | Ji | H04L 67/125 702/188 |
| 2013/0278412 A1 * | 10/2013 | Kelly | G08B 26/00 340/539.1 |

(Continued)

FOREIGN PATENT DOCUMENTS

| | | |
|---|---|---|
| JP | S60-038980 A | 2/1985 |
| JP | H05-002030 A | 1/1993 |

(Continued)

*Primary Examiner* — Brian J. Gillis
*Assistant Examiner* — Javier O Guzman
(74) *Attorney, Agent, or Firm* — Harness, Dickey & Pierce, P.L.C.

(57) ABSTRACT

A measurement system includes a controller which is connected to a first network, and a plurality of sensor units of which is connected to the first network and is provided with a synchronous signal transmitter, and the controller includes a setting section that sets at least one of the plurality of sensor units as a first node which transmits a synchronous signal to the first network.

15 Claims, 11 Drawing Sheets

(56) References Cited

U.S. PATENT DOCUMENTS

| | | | | |
|---|---|---|---|---|
| 2014/0074929 A1* | 3/2014 | Kountouris | .......... | G08B 25/007 |
| | | | | 709/204 |
| 2014/0131555 A1* | 5/2014 | Iida | .................. | G01J 1/4228 |
| | | | | 250/208.2 |
| 2015/0145641 A1* | 5/2015 | Kapinos | ............... | G06F 1/3287 |
| | | | | 340/4.34 |
| 2015/0312350 A1* | 10/2015 | Kauppila | .............. | H04J 3/0638 |
| | | | | 709/248 |
| 2016/0135242 A1* | 5/2016 | Hampel | ............... | H04W 40/02 |
| | | | | 370/329 |

FOREIGN PATENT DOCUMENTS

| | | |
|---|---|---|
| JP | 2001-272420 A | 10/2001 |
| JP | 2011-227795 A | 11/2011 |
| JP | 2014-175755 A | 9/2014 |
| JP | 2014-178952 A | 9/2014 |
| WO | WO-2014-136420 A1 | 9/2014 |
| WO | WO-2014-141651 A1 | 9/2014 |

\* cited by examiner

SYNCHRONIZATION MEASUREMENT SYSTEM, SYNCHRONIZATION MEASUREMENT METHOD, CONTROLLER, SENSOR UNIT, SYNCHRONOUS SIGNAL GENERATION UNIT, SYNCHRONOUS SIGNAL TRANSFER UNIT, AND PROGRAM

BACKGROUND

1. Technical Field

The present invention relates to a synchronization measurement system, a synchronization measurement method, a controller, a sensor unit, a synchronous signal generation unit, a synchronous signal transfer unit, and a program.

2. Related Art

The JP-A-2014-175755 discloses a synchronization measurement system that includes a main controller, a plurality of sub-controllers, and a plurality of sensor units. In the synchronization measurement system, a sub-controller master that receives a start command from the main controller generates a trigger signal, and transmits the trigger signal to a sub-controller slave. In addition, each of the plurality of sub-controllers (the sub-controller master and the sub-controller slave) transmits a synchronization command to the plurality of sensor units, based on the trigger signal. Thus, all the sensor units which are connected to all the sub-controllers are synchronized simultaneously.

However, in the above-mentioned JP-A-2014-175755, it is necessary to prepare a plurality of sub-controllers in addition to the main controller, in order to synchronize all sensor units. Therefore, the number of sub-controllers is increased depending on the size of the synchronization measurement system, and thus it is difficult to construct a compact system.

SUMMARY

An advantage of some aspects of the invention is to construct a more compact synchronization measurement system using a sensor unit.

An aspect of the invention is directed to a synchronization measurement system including a controller which is connected to a first network; and a plurality of sensor units of which is connected to the first network and is provided with a synchronous signal transmitter, wherein the controller includes a setting section that sets at least one of the plurality of sensor units as a first node which transmits a synchronous signal to the first network. With this configuration, it is not necessary to provide a dedicated device transmitting the synchronous signal on the sensor network, and it is possible to construct a compact synchronization measurement system.

In the synchronization measurement system, the first node may transmit the synchronous signal to the first network, and a second node may perform measurement, based on the synchronous signal received from the first network, the second node being a sensor unit which is not set as the first node, among the plurality of sensor units. With this configuration, the plurality of sensor units is able to perform measurement that is synchronized based on the synchronous signal.

In the synchronization measurement system, the first node may transmit the synchronous signal to the first network, and a second node may transmit measurement data to the controller, based on the synchronous signal received from the first network, the second node being a sensor unit which is not set as the first node, among the plurality of sensor units. With this configuration, the controller is able to receive the synchronized measurement data, from the plurality of sensor units.

In the synchronization measurement system, the setting section may transmit measurement timing information to the second node, and the second node may perform measurement, or transmit the measurement data, based on the synchronous signal and the measurement timing information. With this configuration, the controller is able to cause the plurality of sensor units to perform measurement at a desired timing, or to receive the measurement data from the plurality of sensor units at the desired timing.

In the synchronization measurement system, the measurement timing information may be a frequency division ratio for a transmission frequency of the synchronous signal, and the second node may perform measurement, or transmit the measurement data, based on the number of receptions of the synchronous signal and the frequency division ratio. With this configuration, the controller can prevent unnecessary measurement from being performed, or unnecessary measurement data from being received.

In the synchronization measurement system, the controller may include a selection unit that selects a transmission frequency of the synchronous signal, and the setting section may set the transmission frequency of the synchronous signal that is selected by the selection unit, in the first node. With this configuration, the user can easily perform adjustment such that measurement suitable for the measurement object is performed.

The synchronization measurement system may further include a plurality of sensor units of which is connected to a second network and is provided with a synchronous signal transmitter, the controller is connected to the second network, and the setting section may set at least one of the plurality of sensor units that are connected to the second network, as the first node which transmits a synchronous signal to the second network. With this configuration, it is not necessary to provide dedicated devices that transmit synchronous signals on the plurality of sensor networks respectively, and it is possible to construct a compact synchronization measurement system.

The synchronization measurement system may further include a plurality of sensor units of which is connected to a second network and is provided with a synchronous signal transmitter, the controller is connected to the second network, and the setting section may set the synchronous signal generation unit, as the first node that is common to the first network and the second network, in a case where the controller is connected to the first network and the second network, and detects a synchronous signal generation unit capable of transmitting the synchronous signal to the first network and the second network. With this configuration, it is possible to easily achieve the synchronization of the sensor units on the plurality of sensor networks.

The synchronization measurement system may further include a plurality of sensor units of which is connected to a second network and is provided with a synchronous signal transmitter; and a synchronous signal transfer unit that is connected to the first network and the second network, the controller may be connected to the second network, and the synchronous signal transfer unit may transfer the synchronous signal which is received from the first network, to the second network. With this configuration, it is possible to simply achieve the synchronization of the sensor units on the plurality of sensor networks.

In the synchronization measurement system, the controller may discard the measurement data from the plurality of sensor units, until the measurement data from any one of the plurality of sensor units satisfies a predetermined condition. With this configuration, the controller is not required to store all pieces of the received measurement data, and it is possible to reduce the storage capacity.

The synchronization measurement system may further include a plurality of sensor units of which is connected to a second network and is provided with a synchronous signal transmitter, and the controller may be connected to the second network, and may discard the measurement data from the plurality of sensor units, until the measurement data from any one of the plurality of sensor units connected to the first network and the plurality of sensor units connected to the second network satisfies a predetermined condition. With this configuration, the controller is not required to store all pieces of the received measurement data, and it is possible to reduce the storage capacity.

In the synchronization measurement system, the first network may be a digital communication network, and the second network may be an analog communication network. With this configuration, it is possible to easily achieve the synchronization of the sensor units on the plurality of sensor networks including the analog communication network and the digital communication network.

In the synchronization measurement system, the first network may include a first communication path and a second communication path, the first node may transmit the synchronous signal to the second node through the first communication path, and the second node may transmit the measurement data to the controller through the second communication path. With this configuration, since the synchronous signal and the measurement data respectively flow through different communication networks, for example, it is possible to reduce the delay of the synchronous signal.

In the synchronization measurement system, the setting section may transmit a setting signal for setting one of the plurality of sensor units as the first node, to one sensor unit, through the second communication path. With this configuration, since the synchronous signal, the setting signal, and the measurement data respectively flow through different communication networks, for example, it is possible to reduce the delay of the synchronous signal.

Another aspect of the invention is directed to a synchronization measurement method of a synchronization measurement system including a controller which is connected to a first network, and a plurality of sensor units of which is connected to the first network and is provided with a synchronous signal transmitter, the synchronization measurement method causing the controller to set at least one of the plurality of sensor units as a first node which transmits a synchronous signal to the first network. With this configuration, it is not necessary to provide a dedicated device that transmits a synchronous signal on the sensor network respectively, and it is possible to construct a compact synchronization measurement system.

Still another aspect of the invention is directed to a controller in a synchronization measurement system, the controller being connected to a first network, and including a setting section that sets at least one of a plurality of sensor units of which is connected to the first network and is provided with a synchronous signal transmitter, as a first node which transmits a synchronous signal to the first network. With this configuration, it is not necessary to provide a dedicated device that transmits a synchronous signal on the sensor network respectively, and it is possible to construct a compact synchronization measurement system.

Yet another aspect of the invention is directed to a program of a controller in a synchronization measurement system, the controller being connected to a first network, the program causing the controller to execute a process of setting at least one of a plurality of sensor units of which is connected to the first network and is provided with a synchronous signal transmitter, as a first node which transmits a synchronous signal to the first network. With this configuration, it is not necessary to provide a dedicated device that transmits a synchronous signal on the sensor network respectively, and it is possible to construct a compact synchronization measurement system.

Still yet another aspect of the invention is directed to a sensor unit in a synchronization measurement system, the sensor unit being connected to a first network, receiving measurement timing information from a controller, and performing measurement or transmitting measurement data to the controller, based on a synchronous signal that is received from the first network, and the measurement timing information. With this configuration, the controller is able to cause the sensor unit to perform measurement at a desired timing, or to receive the measurement data from the sensor unit at the desired timing.

Further another aspect of the invention is directed to a synchronous signal generation unit in a synchronization measurement system, including a plurality of communication sections that are connected to a first network and a second network; and a synchronous signal generator that transmits a synchronous signal to the first network and the second network. With this configuration, it is possible to easily achieve the synchronization of the sensor units on the plurality of sensor networks.

Still further another aspect of the invention is directed to a synchronous signal transfer unit in a synchronization measurement system, including a plurality of communication sections that are connected to a first network and a second network; and a synchronous signal transfer section that transfers a synchronous signal that is received from the first network, to the second network. With this configuration, it is possible to easily achieve the synchronization of the sensor units on the plurality of sensor networks.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings.

First Embodiment

Figure 1:
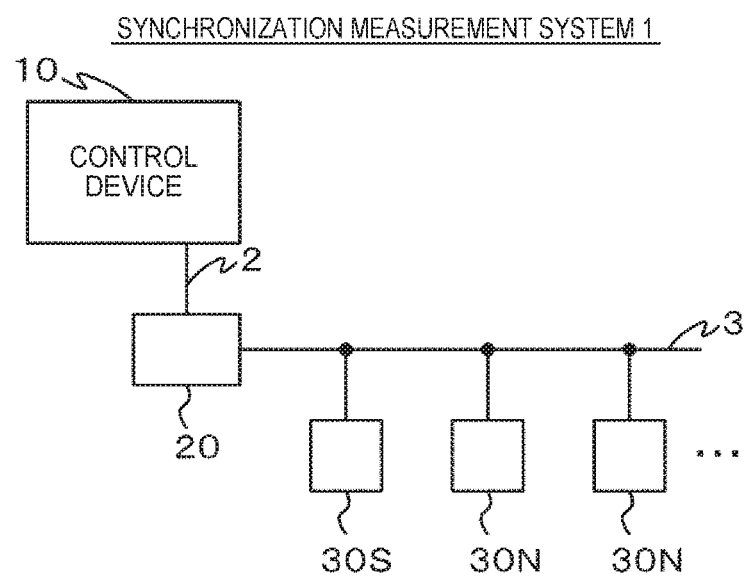
FIG. 1 is a block diagram illustrating an example of a configuration of a synchronization measurement system according to a first embodiment of the invention.

FIG. 1 is a block diagram illustrating an example of a configuration of a synchronization measurement system according to a first embodiment of the invention.

A synchronization measurement system 1 includes a control device (corresponding to a controller according to the invention) 10, a conversion unit 20, and at least two sensor units 30. The control device 10 and the conversion unit 20 are connected to a communication network 2 of the standards such as, for example, a universal serial bus (USB), and communicate with each other. The conversion unit 20 and a plurality of sensor units 30 are connected to a communication network 3 of the standards such as, for example, CAN (controller area network, a registered trademark), and CANopen, and communicate with each other. In addition, the communication network 2 and the communication network 3 may be referred to as a bus.

The conversion unit 20 is connected to the communication network 2 and the communication network 3 and, for example, controls the transmission and reception of signals between those communication networks (USB-CAN) or converts the signals so as to conform to the standards of respective communication networks. In other words, the conversion unit 20 transmits the data received from the communication network 3 to the communication network 2, and transmits the data received from the communication network 2 to the communication network 3. Thus, the control device 10 and the sensor unit 30 can transmit and receive information with each other. Incidentally, the conversion unit 20 may be incorporated into the control device 10 as an on-board unit.

Incidentally, since the existing conversion unit may be used for the conversion unit 20, a detailed description thereof will be omitted. In the following, for ease of explanation, unless it is necessary, with respect to the communication between the control device 10 and the sensor unit 30, a description of the process performed by the conversion unit 20 will be omitted.

The sensor unit 30 includes a sensor unit 30S, and a sensor unit 30N. A single sensor unit 30S is present on the communication network 3, and simultaneously transmits the synchronous signal to the communication network 3 at a predetermined timing, through broadcast communication (broadcasting), based on the setting from the control device 10. One or more sensor units 30N are present on the communication network 3, and measure predetermined physical quantities (for example, an acceleration, an angular velocity, a vibration, a tilt, and the like). Further, if the synchronous signal is received from the communication network 3, the sensor unit 30N transmits the measurement data obtained by measuring to the communication network 3. Examples of the measurement data include at least data indicating the measured physical quantity. The measurement data may include, for example, the measurement time of data.

In the present embodiment, the sensor unit 30S measures a predetermined physical quantity, similarly to the sensor unit 30N. In this case, if the synchronous signal is transmitted to the communication network 3, the sensor unit 30S transmits the measurement data obtained by measuring, to the communication network 3.

The control device 10 performs, for example, the settings of the frequency of the synchronous signal, the transmission interval of the measurement data, and the like, for the sensor unit 30. Further, the control device 10 receives the measurement data transmitted from the sensor unit 30, and accumulates it in the storage device. Incidentally, the accumulated measurement data is used for analysis of an object such as equipment and buildings in which the sensor unit 30 is installed.

Figure 2:
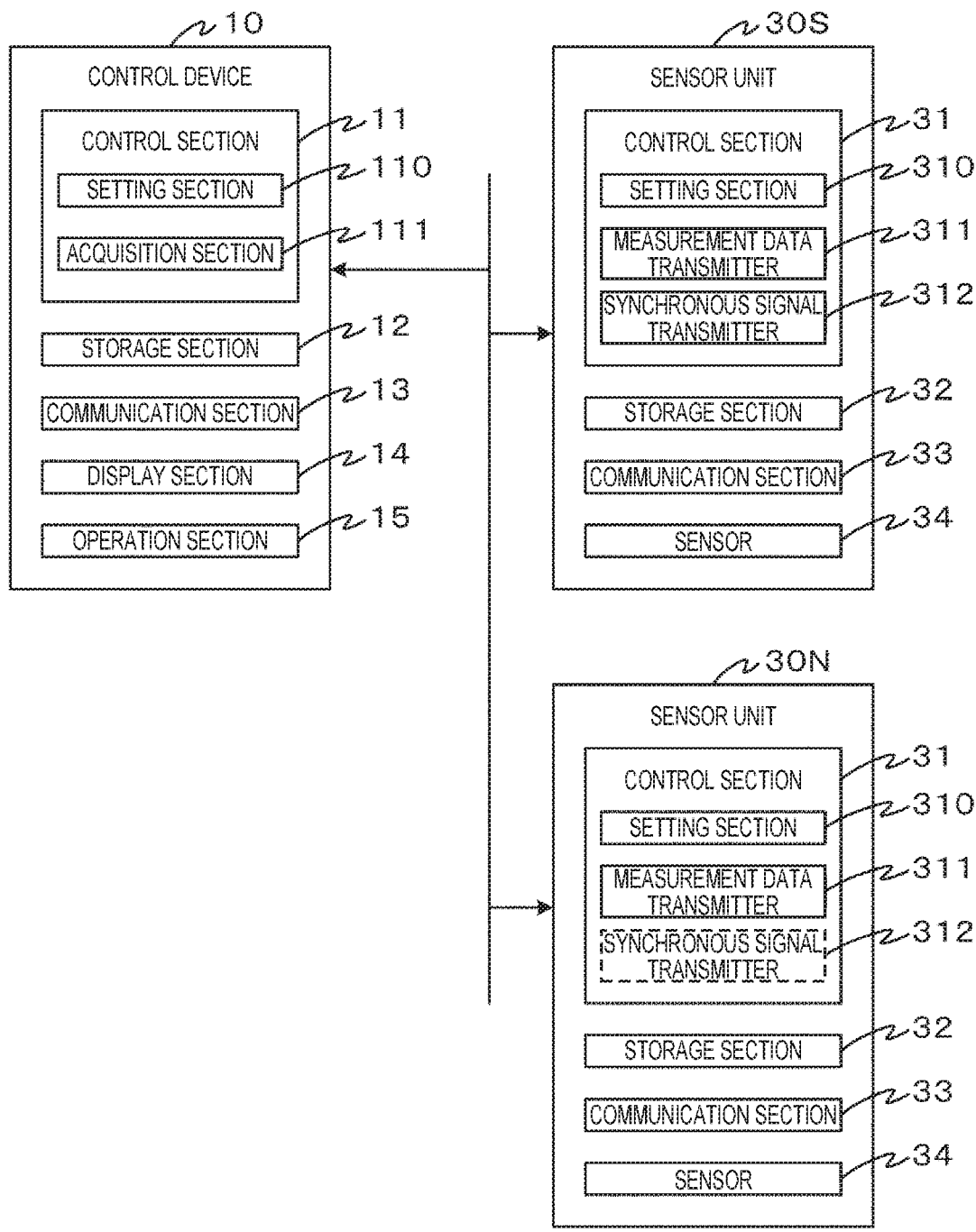
FIG. 2 is a block diagram illustrating an example of configurations of a control device and a sensor unit.

FIG. 2 is a block diagram illustrating an example of configurations of the control device and the sensor unit. The communication network 2, the communication network 3, and the conversion unit 20 are omitted in FIG. 2.

The control device 10 includes a control section 11, a storage section 12, a communication section 13, a display section 14, and an operation section 15.

The control section 11 integrally controls the control device 10. The control section 11 includes a setting section 110, and an acquisition section 111.

The setting section 110 performs the setting of the sensor unit 30 through the communication section 13. The setting section 110 detects, for example, the sensor units 30 that is a node present on the communication network 3. In addition, the setting section 110 selects, for example, one node from the detected nodes (sensor units 30), and sets the selected node so as to operate as a node that transmits a synchronous signal (the sensor unit 30S, corresponding to the first node in the invention) (or to stop the operation). In addition, the setting section 110 sets, for example, the transmission frequency of the synchronous signal, for the sensor unit 30S.

In addition, the setting section 110 selects, for example, one or more nodes from the detected nodes (sensor unit 30), and sets the selected node so as to operate as a node that transmits measurement data (the sensor unit 30S and the sensor unit 30N, corresponding to the first node and the second node respectively in the invention) (or to stop the operation). In addition, the setting section 110 sets, for example, the transmission interval of measurement data (for example, the ratio of the transmission frequency of the synchronous signal to the measurement frequency (in other words, a frequency division ratio, corresponding to the measurement timing information according to the invention)), as the transmission timing of the measurement data, for the sensor unit 30S and the sensor unit 30N. Note that in the present embodiment, it is assumed that all of the sensor units 30 are set to transmit the measurement data.

The acquisition section 111 acquires the measurement data that has been transmitted from each sensor unit 30 through the communication section 13, and stores it in the storage section 12.

The storage section 12 stores data that is used for processing by the control section 11, the acquired measurement data, and the like. The communication section 13 is connected to the communication network 2, and transmits and receives information. The display section 14 displays a screen or the like. The operation section 15 receives the user's operation input, and outputs an operation signal corresponding to the operation to the control section 11.

In addition, the control device 10 can be realized by, for example, a computer. The computer includes, for example, an arithmetic device such as a central processing unit (CPU), a main storage device such as a random access memory (RAM), an auxiliary storage device such as a flash read only memory (ROM) and a hard disk drive (HDD), a communication interface (I/F) for connection to a communication line, an input device such as a keyboard and a mouse, a display device such as a liquid crystal display, a reader/writer that reads and writes information from and to a portable storage medium such as a digital versatile disk (DVD), and an external I/F for connection to an external device through an universal serial bus (USB), and the like.

If the above computer functions as a control device 10, the control section 11 is realized by, for example, at least one of the arithmetic device, the main storage device, and the auxiliary storage device. In other words, the processes and functions of the control section 11 can be realized, for example, by the arithmetic device loading a predetermined program stored in the auxiliary storage device into the main storage device and executing the program. The storage section 12 can be realized by, for example, the main storage device or the auxiliary storage device. Some or all of the storage section 12 may be realized by, for example, a storage or the like on the communication network which is connected through the communication I/F. The communication section 13 is realized by, for example, the external I/F. For example, the predetermined program is circulated by being stored in a state of being downloadable to a computer on a communication network, or by being stored in a portable storage medium such as a DVD, and can be installed in the control device 10.

The sensor unit 30 includes a control section 31, a storage section 32, a communication section 33, and a sensor 34.

The control section 31 integrally controls the sensor unit 30. The control section 31 includes a setting section 310, and a measurement data transmitter 311. Further, the control section 31 of the sensor unit 30S includes a synchronous signal transmitter 312, and the control section 31 of the sensor unit 30N does not include the synchronous signal transmitter 312.

The setting section 310 performs the setting of the sensor unit 30, based on the setting from the control device 10 through the communication section 33. In a case of receiving, for example, a setting the sensor unit 30 so as to operate as a node that transmits a synchronous signal (or to stop the operation), the setting section 310 enables (or disables) the operation of the synchronous signal transmitter 312. In a case of receiving, for example, a setting the sensor unit 30 so as to operate as a node that transmits measurement data (or to stop the operation), the setting section 310 enables (or disables) the operation of the measurement data transmitter 311. In addition, the setting section 310 receives and stores, for example, the settings of the transmission frequency of the synchronous signal, and the transmission interval of the measurement data, in the storage section 32.

The measurement data transmitter 311 is operated in the case of being enabled by the setting section 310. The measurement data transmitter 311 transmits the measurement data that is measured by the sensor 34, through the communication section 33. For example, the measurement data transmitter 311 monitors the synchronous signal from the communication network 3 through the communication section 33. Further, in a case of receiving the synchronous signal, the measurement data transmitter 311 determines whether or not this time is the transmission cycle of the measurement data. For example, in a case where the transmission interval (the frequency division ratio) of the measurement data that has been set is "1", the measurement data transmitter 311 determines a period when each synchronous signal is received, as the transmission cycle. For example, in a case where the transmission interval (the frequency division ratio) of the measurement data that has been set is "5", the measurement data transmitter 311 determines a period when five synchronous signals are received, as the transmission cycle. If the transmission interval is determined, the measurement data transmitter 311 acquires the measurement data stored in the storage section 32 as described later (at least the most recent measurement data), and transmits the measurement data to the communication network 3 through the communication section 33.

The synchronous signal transmitter 312 is operated in the case of being enabled by the setting section 310. The synchronous signal transmitter 312 simultaneously transmits the synchronous signal to the communication network 3 by the communication section 33, through broadcast communication (broadcasting), based on, for example, the transmission frequency of the synchronous signal that has been set. In a case where, for example, the transmission frequency of the synchronous signal is 500 Hz, the synchronous signal transmitter 312 transmits the synchronous signal 500 times per second.

The storage section 32 stores data that is used for processing by the control section 31, and the like. The storage section 32 is realized by, for example, a non-volatile storage device such as a ROM.

The communication section 33 is connected to the communication network 3, and transmits and receives information. The communication section 33 can be realized by, for example, a CANbus interface device, or the like.

The sensor 34 measures predetermined physical quantities (for example, an acceleration, an angular velocity, a vibration, a tilt, and the like). The sensor 34 measures, for example, the physical quantities at the set sampling period (measurement frequency) and outputs it to the control section 31. The control section 31 stores the measurement data that has been output from the sensor 34, in the storage section 32. The storage section 32 stores at least the most recent measurement data.

In addition, the control section 31 can be realized by, for example, a computer including an arithmetic device such as a CPU, a volatile storage device such as a RAM, a non-volatile storage device such as a ROM, and an interface (I/F) circuit connecting the control section 31 and other units, a bus connecting the devices to each other, and the like. In other words, the processes and functions of the control section 31 can be realized by, for example, the CPU loading a predetermined program stored in the ROM into the RAM and executing the program. Incidentally, the computer may include various dedicated processing circuits such as a processing circuit. In other words, at least a part of the processes and functions of the control section 31 may be realized by, for example, circuits.

Figure 3:
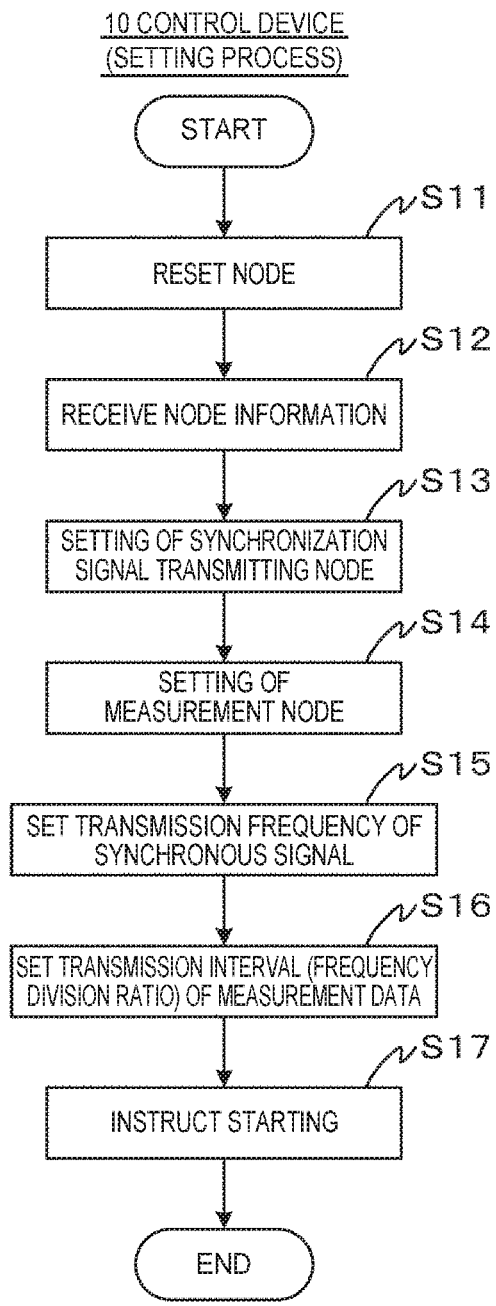
FIG. 3 is a flowchart illustrating an example of a setting process that is performed by the control device.

FIG. 3 is a flowchart illustrating an example of a setting process that is performed by the control device.

Further, the control device 10 resets a node (step S11). Specifically, the setting section 110 transmits a predetermined reset signal to the communication network 3. Each sensor unit 30 performs a reset operation in response to the reset signal.

Then, the control device 10 receives the node information (step S12). Specifically, after the reset process, the sensor unit 30 transmits a signal (also referred to as a heartbeat signal) including node information such as the identifier (ID), the state, and the measurement frequency of a node, to the communication network 3. The acquisition section 111 receives the signal including the node information from the communication network 3 through the communication section 13, and stores it in the storage section 12. Thus, the control device 10 is able to detect a sensor unit 30 that is connected to the communication network 3, the state of the sensor unit 30, the measurement frequency, and the like.

Then, the control device 10 performs a setting of a node transmitting the synchronous signal (step S13). Specifically, the setting section 110 selects a node (sensor unit 30S) transmitting the synchronous signal, from the sensor units 30 which are detected in step S12, based on a predetermined rule. The setting section 110 selects, for example, a node having the largest ID. In addition, the setting section 110 transmits a setting signal for causing the selected sensor unit 30S to operate as a node transmitting the synchronous signal, to the selected sensor unit 30S.

In addition, the procedure of selecting a node transmitting the synchronous signal is not limited to the node having the largest ID. For example, the setting section 110 may select a node having the lowest ID. Further, for example, the setting section 110 configured to receive the selection of the node transmitting the synchronous signal, from the user, through the operation section 15.

Then, the control device 10 performs the setting of the node transmitting the measurement data (step S14). Specifically, the setting section 110 selects the node transmitting the measurement data (sensor unit 30S, and sensor unit 30N), among the sensor units 30 which are detected in step S12, based on a predetermined rule. The setting section 110 selects, for example, all of the nodes. In addition, the setting section 110 transmits a setting signal for operating the selected sensor unit 30S and sensor unit 30N as a node transmitting the measurement data, to the sensor unit 30S and the sensor unit 30N. In addition, the setting section 110 transmits the setting signal including various parameters (for example, a measurement frequency, a measurement time, and the like), to the sensor unit 30S and the sensor unit 30N.

Then, the control device 10 sets the transmission frequency of the synchronous signal (step S15). Specifically, the setting section 110 determines the transmission frequency of the synchronous signal according to a predetermined rule (the details will be described later with reference to FIG. 4), and transmits the setting signal including the transmission frequency of the synchronous signal, to the sensor unit 30S which is selected in step S13.

In addition, the control device 10 sets the transmission interval (frequency division ratio) of the measurement data (step S16). Specifically, the setting section 110 determines the transmission interval (frequency division ratios) of the measurement data of the sensor units 30, for the respective sensor units 30 which are detected in step S12 (the details will be described later with reference to FIG. 4), and transmits the setting signal including the transmission intervals (frequency division ratios) of the measurement data, to the sensor units 30.

Then, the control device 10 instructs the node to start measurement (step S17). Specifically, the setting section 110 transmits an instruction signal for instructing the start of measurement, to the sensor unit 30 which is detected in step 12. The synchronous signal transmitter 312 of the sensor unit 30S starts the transmission of the synchronous signal, based on the transmission frequency of the set synchronous signal, in response to the instruction signal. In addition, the measurement data transmitters 311 of the sensor unit 30S and the sensor unit 30N start the transmission of the measurement data, based on the transmission interval (frequency division ratio) of the set measurement data (described in detail with reference to FIG. 6 below), in response to the instruction signal. Incidentally, the control section 31 starts the measurement by the sensor 34 based on the set measurement frequency, in response to the instruction signal.

Figure 4:
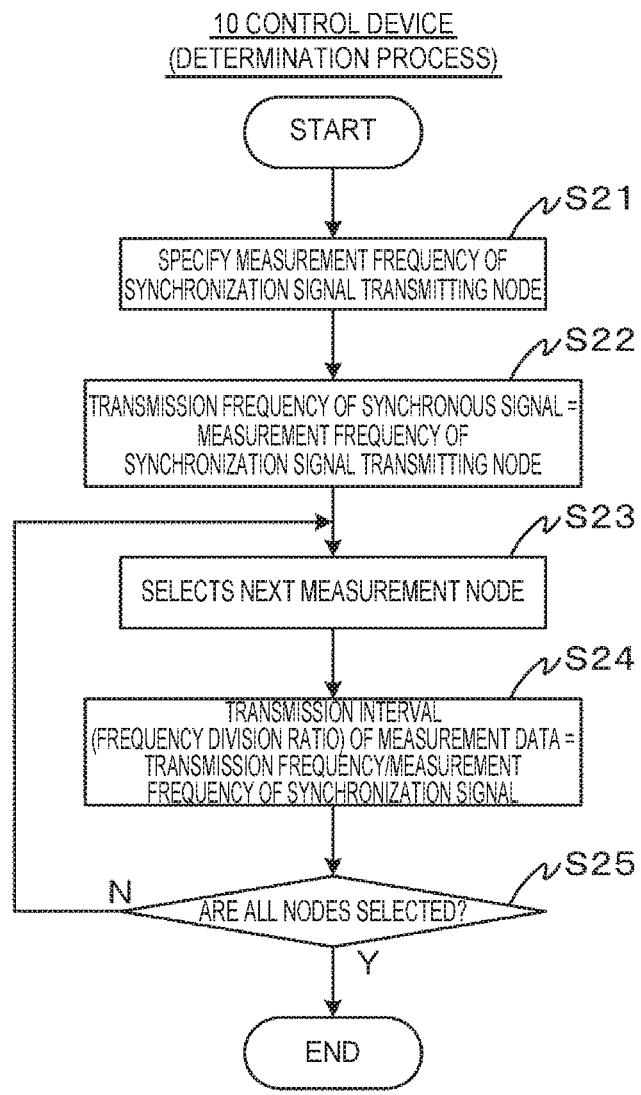
FIG. 4 is a flowchart illustrating an example of a determination process that is performed by the control device.

FIG. 4 is a flowchart illustrating an example of a determination process that is performed by the control device. FIG. 4 illustrates a procedure for determining the transmission frequency of the synchronous signal for the sensor unit 30S and the transmission interval of measurement data for the sensor unit 30, in step S15 and step S16 of FIG. 3.

The setting section 110 specifies the measurement frequency of the sensor unit 30S which is set in step S13 (step S21). In addition, the setting section 110 determines the measurement frequency of the sensor unit 30S that is specified in step S21, as the transmission frequency of the synchronous signal of the sensor unit 30S (step S22).

In addition, the transmission frequency of the synchronous signal is not limited to the measurement frequency. For example, the setting section 110 may use the transmission frequency of the synchronous signal that has been set in advance for the sensor unit 30S. Further, for example, the setting section 110 may be configured to receive the designation of the transmission frequency of the synchronous signal, from the user through the operation section 15.

Then, the setting section 110 selects the next (unselected) node from each sensor unit 30 which is detected in step S12 (step S23).

Further, the setting section 110 determines the transmission interval (frequency division ratio) of the measurement data, for node which is selected in step S23 (step S24). Specifically, the setting section 110 obtains the transmission interval (frequency division ratio) of the measurement data of the sensor unit 30, by diving the transmission frequency of the synchronous signal, which is determined in the step S22, by the measurement frequency of the sensor unit 30 which is selected in step S23. Incidentally, in a case where the measurement frequency is higher than the transmission frequency of the synchronous signal, the frequency division ratio may be set to 1. For example, in a case where the measurement frequency is "500 Hz", and the transmission frequency of the synchronous signal is "500 Hz", the transmission interval (frequency division ratio) of the measurement data is "1". In addition, for example, in a case where the measurement frequency is "100 Hz", and the transmission frequency of the synchronous signal is "500 Hz", the transmission interval (frequency division ratio) of the measurement data is "5".

Then, the setting section 110 determines whether or not all of the nodes are selected, from the respective sensor units 30 which are detected in step S12 (step S25). In a case where it is determined that all of the nodes are not selected (N in step S25), the setting section 110 performs the process of step S23 again. In a case where it is determined that all of the nodes are selected (Y in step S25), the setting section 110 ends the process of the flowchart illustrated in FIG. 4.

Figure 5:
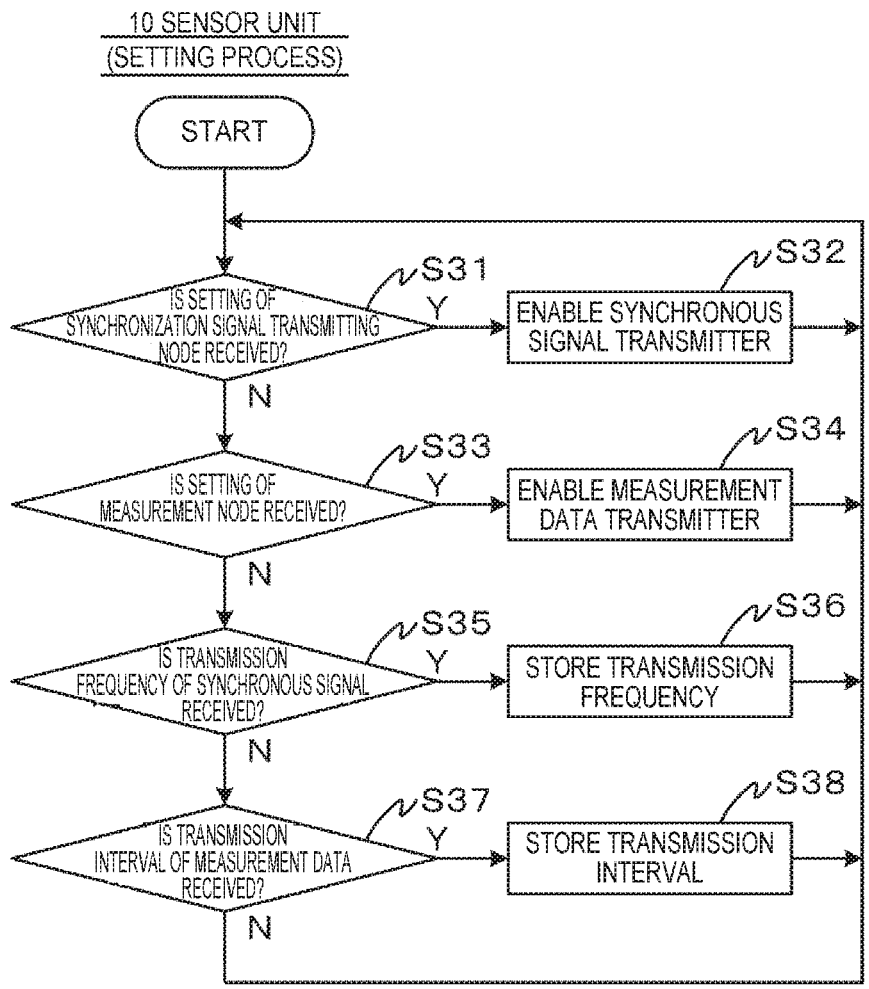
FIG. 5 is a flowchart illustrating an example of a setting process that is performed by the sensor unit.

FIG. 5 is a flowchart illustrating an example of a setting process that is performed by the sensor unit. FIG. 5 illustrates a process relating to setting for the sensor unit 30.

The setting section 310 determines whether or not a setting signal for operating the sensor unit as a node transmitting the synchronous signal (step S31). In a case where it is determined that the synchronous signal is received (Y in step S31), the setting section 310 enables the operation of the synchronous signal transmitter 312 (step S32), and performs the process of step S31 again.

In a case where it is determined that the setting signal for operating the sensor unit as a node transmitting the synchronous signal is not received (N in step S31), the setting section 310 determines whether or not the setting signal for operating the sensor unit as a node transmitting the measurement data is received (step S33). In a case where it is determined that the setting signal is received (Y in step S33), the setting section 310 enables the operation of the measurement data transmitter 311 (step S34), and performs the process of step S31 again. Incidentally, in a case of receiving the setting signal including various parameters (for example, a measurement frequency, a measurement time, and the like), the setting section 310 stores the setting in the storage section 32.

In a case where it is determined that the setting signal for operating the sensor unit as a node transmitting the measurement data is not received (N in step S33), the setting section 310 determines whether or not the setting signal including the transmission frequency of the synchronous signal is received (step S35). In a case where it is determined that the setting signal is received (Y in step S35), the setting section 310 stores the setting in the storage section 32 (step S36), and performs the process of step S31 again.

In a case where it is determined that the setting signal including the transmission frequency of the synchronous signal is not received (N in step S35), the setting section 310 determines whether or not the setting signal including the transmission interval (frequency division ratio) of the measurement data (step S37). In a case where it is determined that the setting signal is received (Y in step S37), the setting section 310 stores the setting in the storage section 32 (step S38), and performs the process of step S31 again. In a case where it is determined that the setting signal is not received (N in step S37), the setting section 310 performs the process of step S31 again.

Figure 6:
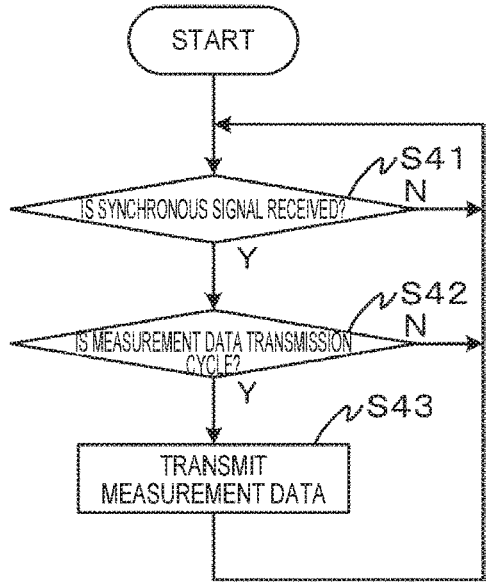
FIG. 6 is a flowchart illustrating an example of a measurement data transmission process that is performed by the sensor unit.

FIG. 6 is a flowchart illustrating an example of a measurement data transmission process that is performed by the sensor unit. The flowchart of FIG. 6 is started, in a case where the sensor unit 30 receives an instruction signal for instructing the start of measurement.

The measurement data transmitter 311 determines whether or not a synchronous signal is received from the communication network 3 through the communication section 33 (step S41). In a case where it is determined that the synchronous signal is not received (N in step S41), the measurement data transmitter 311 performs the process of step S41 again.

In a case where it is determined that the synchronous signal is received (Y in step S41), the measurement data transmitter 311 determines whether or not this time is the transmission cycle of the measurement data (step S42). For example, the measurement data transmitter 311 counts the number of times when the synchronous signal is received. Further, for example, in a case where the transmission interval (frequency division ratio) of measurement data that is set is "1", the measurement data transmitter 311 determines a case where the count number of the synchronous signal reaches a predetermined number of times (for example, 1 (frequency division ratio)), that is, every time, as the transmission cycle. Meanwhile, in a case where the transmission interval (frequency division ratio, for example "5") that is longer than "1" is set, the measurement data transmitter 311 determines a case where the count number of the synchronous signal reaches a predetermined number of times (for example, 5 (frequency division ratio)) as the transmission cycle. In a case where it is determined that this time is not the transmission cycle of the measurement data (N in step S42), the measurement data transmitter 311 performs the process of step S41 again.

In a case where it is determined that this time is the transmission cycle of the measurement data (Y in step S42), the measurement data transmitter 311 acquires the measurement data (at least the most recent measurement data) that is stored in the storage section 32, and transmits the measurement data to the control device 10 (step S43). Then, the measurement data transmitter 311 sets the count number of the synchronous signal to 0, and performs the process of step S41 again.

In addition, the measurement data transmitter 311 of the sensor unit 30S determines whether or not the synchronous signal is transmitted by the synchronous signal transmitter 312, and in a case where the synchronous signal is transmitted, whether or not the synchronous signal is the transmission cycle of the measurement data may be determined.

Figure 7:
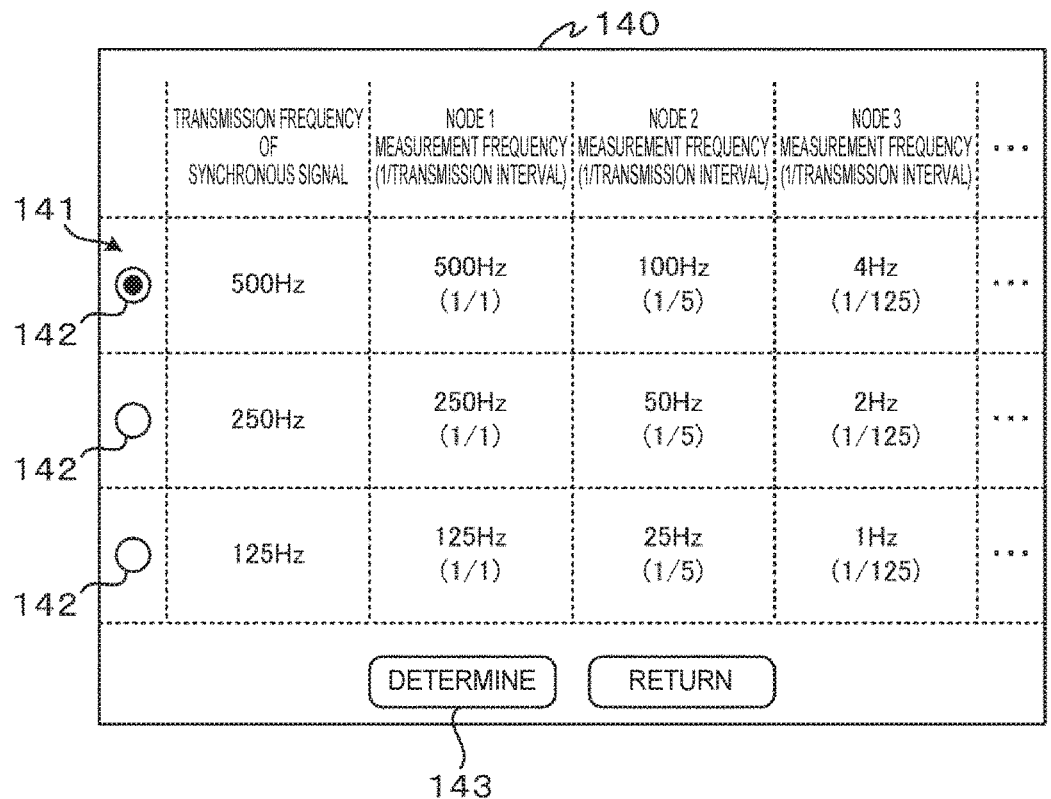
FIG. 7 is a diagram illustrating an example of an interface screen for setting a transmission frequency and a measurement frequency of a synchronous signal.

FIG. 7 is a diagram illustrating an example of an interface screen for setting a transmission frequency and a measurement frequency of a synchronous signal. Incidentally, the aspect of the interface screen illustrated in FIG. 7 is an example, and is not limited to the illustrated aspect.

In step S15 and step S16 of FIG. 3, the transmission frequency of the synchronous signal to be set in the sensor unit 30S, and the measurement frequency and the transmission interval of the measurement data to be set in the sensor unit 30S and the sensor unit 30N may be allowed to selected by the user. In this case, the setting section 110 displays, for example, interface screen (corresponding to the selection unit according to the invention) 140 on the display section 14, and receives an operation on the interface screen 140 by the user through the operation section 15.

A plurality of combinations 141 of the transmission frequency of the synchronous signal, and the measurement frequency of each node and the transmission frequency (frequency division ratio) of the measurement data, in a case where the transmission frequency is set, are displayed on the interface screen 140 so as to be selectable by a selection button (corresponding to the selection unit according to the invention) 142. In addition, a determination button 143 for determining the combination 141 selected by the selection button 142 as the setting is displayed on the interface screen 140.

The setting section 110 specifies, for example, the measurement frequency of the sensor unit 30S as a first candidate for the transmission frequency of the synchronous signal. Further, the setting section 110 specifies the frequency of the N-th (N is an integer of 2 or more) candidate based on the frequency of the first candidate. For example, the setting section 110 specifies the frequency/$2^{N-1}$ of the first candidate, as the frequency of the N-th candidate. In this case, if the first candidate is 500 Hz, the second candidate is 250 Hz, and the third candidate is 125 Hz.

Further, the setting section 110 specifies the measurement frequency and the transmission interval of the measurement data of each sensor unit 30, for the transmission frequency of the synchronous signal of each candidate that is specified as above. For example, the setting section 110 specifies the maximum measurement frequency of each sensor unit 30, and the transmission interval (frequency division ratio) at that time, for the transmission frequency of the synchronous signal of the first candidate. Further, the setting section 110 specifies the maximum measurement frequency/$2^{N-1}$ of each sensor unit 30 as the measurement frequency, for the transmission frequency of the synchronous signal of the N candidate, and specifies the transmission interval (frequency division ratio) at that time.

In the example of FIG. 7, a combination 510 including the transmission frequency "500 Hz" of the synchronous signal, the measurement frequency "500 Hz" and the transmission interval "1" of the node 1, the measurement frequency "100 Hz" and the transmission interval "5" of the node 2, and the measurement frequency "4 Hz" and the transmission interval "125" of the node 3 is displayed as the first candidate. In addition, a combination 510 including the transmission frequency "250 Hz" of the synchronous signal, the measurement frequency "250 Hz" and the transmission interval "1" of the node 1, the measurement frequency "50 Hz" and the transmission interval "5" of the node 2, and the measurement frequency "2 Hz" and the transmission interval "125" of the node 3 is displayed as the second candidate. In addition, a combination 510 including the transmission frequency "125 Hz" of the synchronous signal, the measurement frequency "125 Hz" and the transmission interval "1" of the node 1, the measurement frequency "25 Hz" and the transmission interval "5" of the node 2, and the measurement frequency "1 Hz" and the transmission interval "125" of the node 3 is displayed as the third candidate.

When receiving an operation of the determination button 143 from the user through the operation section 15, the setting section 110 acquires the setting (the transmission frequency of the synchronous signal, and the measurement frequency and the transmission interval of the measurement data of each node) indicated by the combination 141 that is selected by the selection button 142. The setting section 110 transmits the setting signal including the transmission frequency of the acquired synchronous signal to the sensor unit 30S. In addition, the setting section 110 transmits the setting signal including the measurement frequency and the transmission interval of the measurement data, which are acquired for each sensor unit 30, to each sensor unit 30.

Hitherto, the first embodiment of the invention has been described. For example, according to the first embodiment, a single sensor unit 30S out of the plurality of sensor units 30 on the sensor network transmits the synchronous signal. Thus, it is not necessary to provide a dedicated device transmitting the synchronous signal on the sensor network, and it is possible to construct a compact synchronization measurement system 1.

Also, for example, according to the first embodiment, the control device 10 performs the selection and the setting of the node transmitting the synchronous signal and the selection and the setting of the node transmitting the measurement data. Thus, it is possible to easily configure the setting of the synchronization measurement system 1.

Further, for example, according to the first embodiment, the control device 10 performs the determination and setting of the transmission interval (frequency division ratio) of the measurement data of each sensor unit 30, based on the transmission frequency of the synchronous signal. In addition, each sensor unit 30 transmits the measurement data based on the frequency division ratio that is set. Thus, the synchronization measurement system 1 is set such that the correct measurement data is obtained at a desired appropriate timing. In a system without the function of setting the frequency division ratio as in the present embodiment, for example, in a case where the transmission frequency of the synchronous signal is greater than the measurement frequency, there is a possibility that the synchronous signal is received before the next measurement timing and thus unnecessary data (for example, measurement data that has already been transmitted) is transmitted. In this case, the communication band of the network is consumed due to the transmission of unnecessary data, and a process of distinguishing necessary data and unnecessary data is required on the control device 10 side.

In addition, for example, according to the first embodiment, the control device 10 displays a plurality of candidates for the set value such as the transmission frequency of the synchronous signal, and causes the user to perform selection. This makes it possible to easily adjust the synchronization measurement system 1 such that the measurement suitable for the measurement object is performed.

Second Embodiment

In the first embodiment, a single sensor unit 30S among the plurality of sensor units 30 transmits the synchronous signal, but in a second embodiment, a synchronous signal generation unit that transmits the synchronous signal is provided, separately from the plurality of sensor units 30. The following description will focus on those different from the first embodiment.

Figure 8:
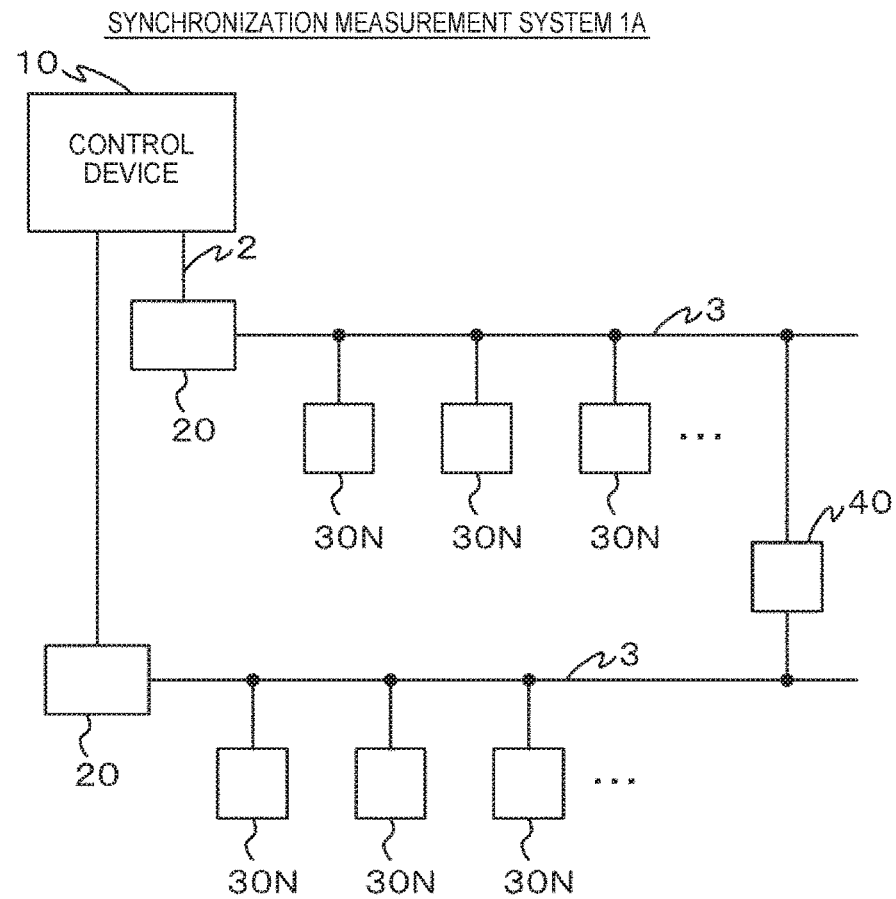
FIG. 8 is a block diagram illustrating an example of a configuration of a synchronization measurement system according to a second embodiment of the invention.

FIG. 8 is a block diagram illustrating an example of a configuration of a synchronization measurement system according to a second embodiment of the invention.

A synchronization measurement system 1A includes a synchronous signal generation unit 40, in addition to the control device 10, and a plurality of sensor units 30. The control device 10 is connected to a plurality of communication networks 3, through a plurality of conversion units 20. The plurality of communication networks 3 are respectively connected to at least one or more sensor units 30N. In addition, the plurality of communication networks 3 are connected to one synchronous signal generation unit 40.

The synchronous signal generation unit 40 simultaneously transmits the synchronous signal to the plurality of communication networks 3 at a predetermined timing, through broadcast communication, based on the setting from the control device 10.

The control device 10 performs, for example, the setting of the frequency or the like of the synchronous signal, for the synchronous signal generation unit 40. In addition, the control device 10 includes a plurality of communication sections 13, for connection to the plurality of conversion units 20, respectively.

Figure 9:
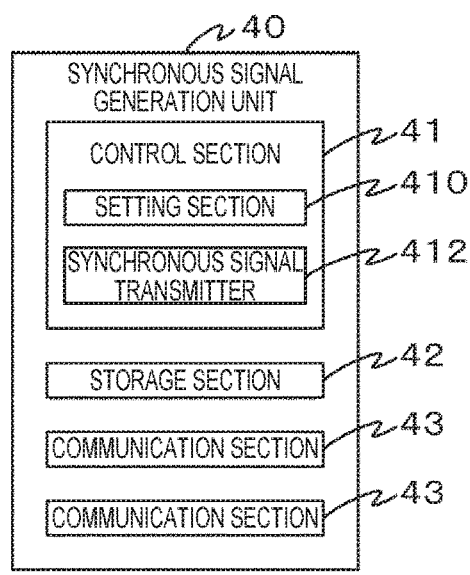
FIG. 9 is a block diagram illustrating an example of a configuration of a synchronous signal generation unit.

FIG. 9 is a block diagram illustrating an example of a configuration of a synchronous signal generation unit.

The synchronous signal generation unit 40 includes a control section 41, a storage section 42, and a plurality of communication sections 43.

The control section 41 integrally controls the synchronous signal generation unit 40. The control section 41 includes a setting section 410, and a synchronous signal transmitter 412.

The setting section 410 performs the setting of the synchronous signal generation unit 40, based on the instruction from the control device 10 through any one communication section 43. The setting section 410 receives, for example, the setting of the transmission frequency of the synchronous signal, and stores the setting in the storage section 12.

The synchronous signal transmitter 412 transmits the synchronous signal. The synchronous signal transmitter 412 simultaneously transmits the synchronous signal to each communication network 3, through broadcast communication, by a plurality of communication sections 43, based on the transmission frequency of the synchronous signal that has been set.

The storage section 42 stores data that is used for processing by the control section 41, and the like. The storage section 42 is realized by, for example, a non-volatile storage device such as a ROM.

The plurality of communication sections 43 are respectively connected to the communication network 3, and transmit and receive information. The communication sections 43 can be realized by, for example, a CANbus interface device, or the like.

In addition, the control section 41 can be realized by, for example, a computer including an arithmetic device such as a CPU, a volatile storage device such as a RAM, a non-volatile storage device such as a ROM, and an interface (I/F) circuit connecting the control section 41 and other units, a bus connecting the devices to each other, and the like. In other words, the processes and functions of the control section 41 can be realized by, for example, the CPU loading a predetermined program stored in the ROM into the RAM and executing the program. Incidentally, the computer may include various dedicated processing circuits such as a processing circuit. In other words, at least a part of the processes and functions of the control section 41 may be realized by, for example, circuits.

Next, differences from the first embodiment will be described with reference to FIG. 3.

In steps S11 to S12 in FIG. 3, the synchronous signal generation unit 40 performs a reset operation in response to a reset signal, and after the reset process, transmits a signal including node information such as the ID of a node, to the communication network 3. Here, it is assumed that a specific ID (for example, the largest ID on the plurality of communication networks 3 connected to the synchronous signal generation unit 40) is granted to the synchronous signal generation unit 40. Therefore, the control device 10 is able to detect the synchronous signal generation unit 40.

In step S13 of FIG. 3, the setting section 110 selects, for example, a node having the largest ID (synchronous signal generation unit 40), and transmits a setting signal for causing the selected node to operate as a node transmitting the synchronous signal, to the selected synchronous signal generation unit 40. In addition, if the setting signal is received, the setting section 410 of the synchronous signal generation unit 40 enables the operation of the synchronous signal transmitter 412.

In step S15 of FIG. 3, the setting section 110 transmits the setting signal including the transmission frequency of the synchronous signal that is determined according to a predetermined rule, to the synchronous signal generation unit 40 that is selected in step S13. In addition, the setting section 410 of the synchronous signal generation unit 40 stores the settings that is received, in the storage section 42.

In step S17 of FIG. 3, the setting section 110 transmits an instruction signal for instructing the start of measurement, to the sensor unit 30 and the synchronous signal generation unit 40 which are detected in step 12. The synchronous signal transmitter 412 of the synchronous signal generation unit 40 starts the transmission of the synchronous signal based on the transmission frequency of the set synchronous signal, in response to the instruction signal.

Hitherto, the second embodiment of the invention has been described. According to the second embodiment, for example, the synchronous signal generation unit is connected as a common unit to the plurality of sensor networks, and transmits the synchronous signal to the plurality of sensor networks. Thus, it is possible to easily achieve the synchronization of sensor units on the plurality of sensor networks. Further, in the case where respective sensor units 30S are separately provided on the plurality of sensor networks, it is difficult to transmit the synchronous signal which are synchronized between these sensor units 30S.

Third Embodiment

In the first embodiment, the synchronous signal from the sensor unit 30S is transmitted to the communication network 3 connected to the sensor unit 30S, but in a third embodiment, a synchronous signal transfer unit that transfers the synchronous signal to other communication network 3 which is not connected to the sensor unit 30S is provided. The following description will focus on those different from the first embodiment.

Figure 10:
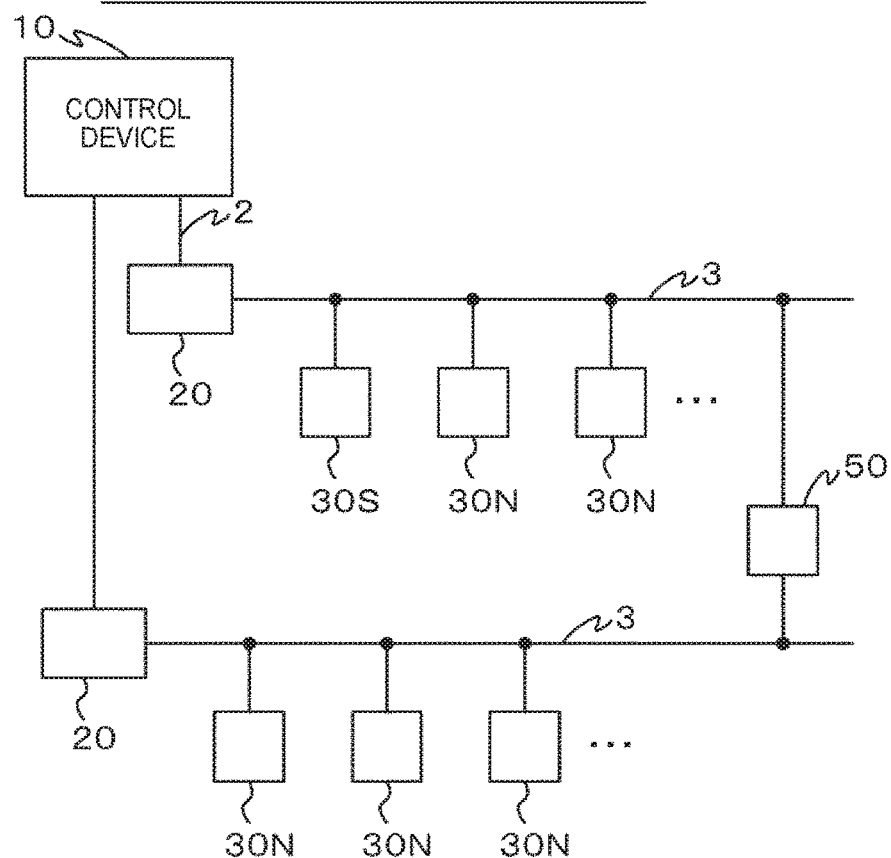
FIG. 10 is a block diagram illustrating an example of a configuration of a synchronization measurement system according to a third embodiment of the invention.

FIG. 10 is a block diagram illustrating an example of a configuration of a synchronization measurement system according to a third embodiment of the invention.

A synchronization measurement system 1B includes a synchronous signal transfer unit 50, in addition to the control device 10, and a plurality of sensor units 30. The control device 10 is connected to a plurality of communication network 3, through a plurality of conversion units 20. The plurality of communication networks 3 are respectively connected to at least one or more sensor units 30. In addition, the plurality of communication networks 3 are connected to one synchronous signal transfer unit 50.

The synchronous signal transfer unit 50 is connected to the plurality of communication networks 3, and transfers the synchronous signal received from one communication network 3, to the other communication network 3.

The control device 10 sets a single sensor unit 30S that transmits the synchronous signal, from the plurality of sensor units 30 connected to the plurality of communication networks 3. In addition, the control device 10 includes a plurality of communication sections 13, for connection to the plurality of conversion units 20, respectively.

Figure 11:
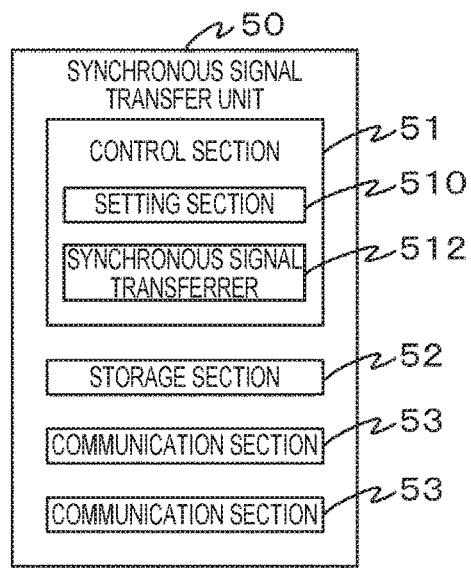
FIG. 11 is a block diagram illustrating an example of a configuration of a synchronous signal transfer unit.

FIG. 11 is a block diagram illustrating an example of a configuration of a synchronous signal transfer unit.

A synchronous signal transfer unit 50 includes a control section 51, a storage section 52, and a plurality of communication sections 53.

The control section 51 integrally controls the synchronous signal transfer unit 50. The control section 51 includes a setting section 510, and a synchronous signal transfer section 512.

The setting section 510 performs the setting of the synchronous signal transfer unit 50, based on the instruction from the control device 10 through any one communication section 53. The setting section 510 receives, for example, the setting of the transfer frequency of the synchronous signal, and stores the setting in the storage section 52.

The synchronous signal transfer section 512 transfers the synchronous signal. The synchronous signal transfer section 512 receives the synchronous signal from one communication network 3 by one communication section 53, and simultaneously transfers the synchronous signal to the other communication network 3, through broadcast communication, by the other communication section 53, based on, for example, the transfer frequency of the synchronous signal that has been set.

The storage section 52 stores data that is used for processing by the control section 51, and the like. The storage section 52 is realized by, for example, a non-volatile storage device such as a ROM.

The plurality of communication sections 53 are respectively connected to the communication network 3, and transmit and receive information. The communication sections 53 can be realized by, for example, a CANbus interface device, or the like.

In addition, the control section 51 can be realized by, for example, a computer including an arithmetic device such as a CPU, a volatile storage device such as a RAM, a non-volatile storage device such as a ROM, and an interface (I/F) circuit connecting the control section 51 and other units, a bus connecting the devices to each other, and the like. In other words, the processes and functions of the control section 51 can be realized by, for example, the CPU loading a predetermined program stored in the ROM into the RAM and executing the program. Incidentally, the computer may include various dedicated processing circuits such as a processing circuit. In other words, at least a part of the processes and functions of the control section 51 may be realized by, for example, circuits.

Next, differences from the first embodiment will be described with reference to FIG. 3.

In steps S11 to S12 in FIG. 3, the synchronous signal transfer unit 50 performs a reset operation in response to a reset signal, and after the reset process, transmits a signal including node information such as the ID of a node, to the communication network 3. Here, it is assumed that a specific ID is granted to the synchronous signal transfer unit 50.

In step S13 of FIG. 3, the setting section 110 selects, for example, a node having the specific ID (synchronous signal transfer unit 50), and transmits a setting signal for causing the selected node to operate as a node transferring the synchronous signal, to the selected synchronous signal transfer unit 50. In addition, if the setting signal is received, the setting section 510 of the synchronous signal transfer unit 50 enables the operation of the synchronous signal transfer section 512.

In step S15 of FIG. 3, the setting section 110 transmits the setting signal including the same transfer frequency as the transmission frequency of the synchronous signal that is determined according to a predetermined rule, to the synchronous signal transfer unit 50 that is selected in step S13. In addition, the setting section 510 of the synchronous signal transfer unit 50 stores the settings that is received, in the storage section 52.

In step S17 of FIG. 3, the setting section 110 transmits an instruction signal for instructing the start of measurement, to the sensor unit 30 and the synchronous signal transfer unit 50 which are detected in step 12. The synchronous signal transfer section 512 of the synchronous signal transfer unit 50 starts the reception and transfer of the synchronous signal, based on the transfer frequency of the set synchronous signal, in response to the instruction signal.

Hitherto, the third embodiment of the invention has been described. According to the third embodiment, for example, the synchronous signal transfer unit is connected to the plurality of sensor networks, and transfers the synchronous signal from a single sensor network, to another sensor network. Thus, it is possible to easily achieve the synchronization of sensor units on the plurality of sensor networks. Further, in the case where respective sensor units 30S are separately provided on the plurality of sensor networks, it is difficult to transmit the synchronous signal which are synchronized between these sensor units 30S.

Fourth Embodiment

In the first embodiment, in a case of acquiring the measurement data that is transmitted from each sensor unit 30, the control device 10 stores the acquired measurement data in the storage device, but in a fourth embodiment, in a case where a predetermined condition is satisfied, the control device 10 stores the acquired measurement data in the storage device. The following description will focus on those different from the first embodiment.

Figure 12:
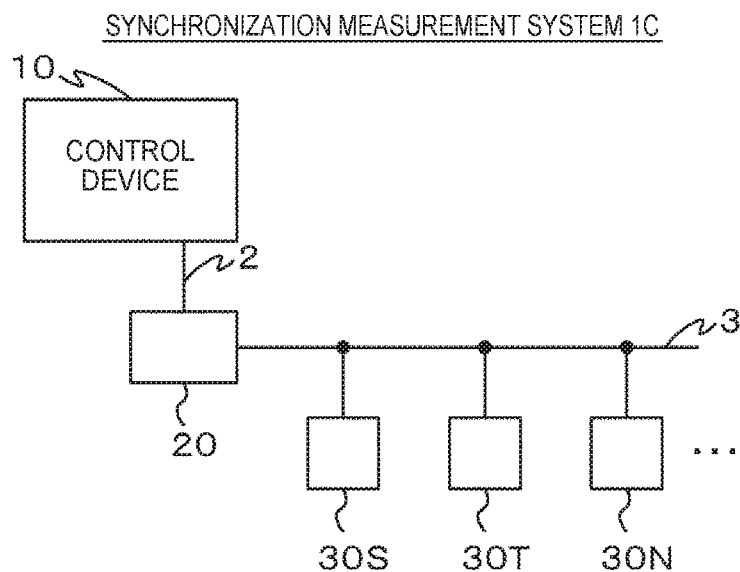
FIG. 12 is a block diagram illustrating an example of a configuration of a synchronization measurement system according to a fourth embodiment of the invention.

FIG. 12 is a block diagram illustrating an example of a configuration of a synchronization measurement system according to a fourth embodiment of the invention.

The synchronization measurement system 1C is basically the same as the synchronization measurement system (FIG. 1). They are different in the operation of the acquisition section 111 of the control device 10. The acquisition section 111 determines the value of the measurement data, every time the measurement data is acquired from a certain sensor unit 30T of the plurality of sensor units 30, after the start of the measurement, and discards the measurement data received from the plurality of sensor units 30 until a predetermined condition is satisfied. Incidentally, any of the sensor units 30 may be set as the sensor unit 30T.

In addition, in a case where the value of the measurement data from the sensor unit 30T satisfies the predetermined condition (for example, in a case of exceeding a predetermined threshold value), the acquisition section 111 starts storing the measurement data received from the plurality of sensor units 30 in the storage section 12.

Incidentally, the acquisition section 111 is configured to temporarily store the measurement data for a predetermined period before the current time in a memory or the like, and in a case where the value of the measurement data from the sensor unit 30T satisfies the predetermined condition, the acquisition section 111 may store the measurement data for a predetermined period before the current time in the storage section 12. Further, in a case where a predetermined time has elapsed from when the value of the measurement data from the sensor unit 30T satisfies the predetermined condition, the acquisition section 111 may end storing the measurement data received from the plurality of sensor units 30 in the storage section 12.

Hitherto, the fourth embodiment of the invention has been described. According to the fourth embodiment, for example, the control device 10 is not required to store all pieces of the received measurement data, after the start of measurement, and it is possible to reduce the storage capacity. Further, it is possible to use the measurement data from a certain sensor unit, as a trigger to store the measurement data from other sensor units.

Fifth Embodiment

In the fourth embodiment, in a case where the measurement data from a certain sensor unit 30 connected to a single communication network 3 satisfies a predetermined condition, the control device 10 starts storing the measurement data from the sensor unit 30 connected to the same communication network 3. In the fifth embodiment, in a case where the measurement data from a certain sensor unit connected to a single communication network 3 satisfies a predetermined condition, the control device 10 starts storing the measurement data from the sensor units which are connected to the single communication network and the other communication network. The following description will focus on those different from the fourth embodiment.

Figure 13:
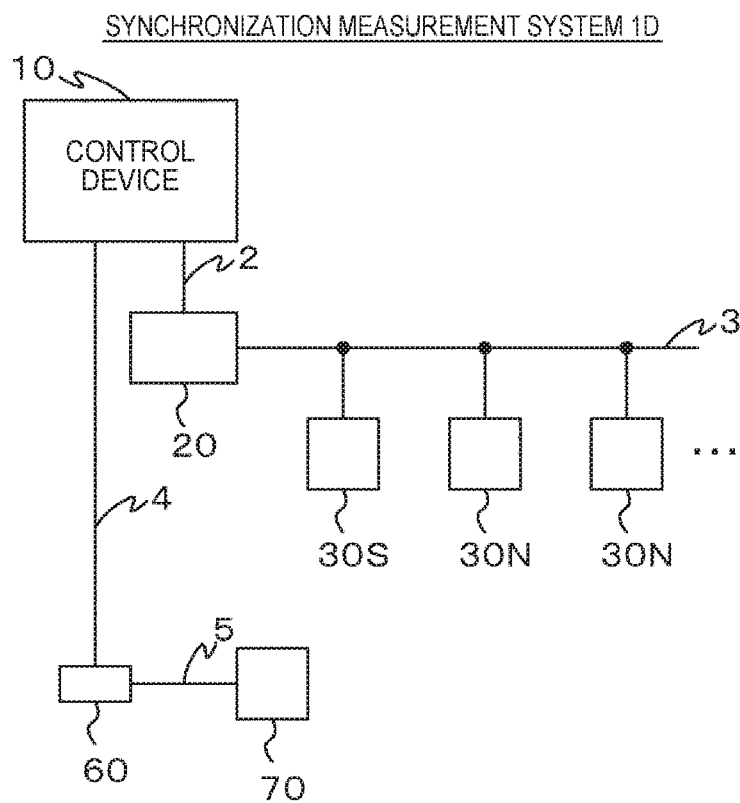
FIG. 13 is a block diagram illustrating an example of a configuration of a synchronization measurement system according to a fifth embodiment of the invention.

FIG. 13 is a block diagram illustrating an example of a configuration of a synchronization measurement system according to a fifth embodiment of the invention.

The synchronization measurement system 1D has the same configuration of the communication network 3 side as that of the synchronization measurement system 1 (FIG. 1). There is a difference in that the control device 10 is connected to the conversion unit 60 through a communication network 4, and communicates with the sensor unit 70 that is connected to the conversion unit 60 through a communication network 5. The sensor unit 70 measures and outputs, for example, predetermined physical quantities. The conversion unit 60 is connected to the communication network 4 and the communication network 5, and, for example, controls the transmission and reception of signals between those communication networks, or converts the signals so as to conform to the respective communication standards. In addition, for example, the sensor unit 70 is an analog sensor, and the conversion unit 60 is an analog/digital conversion unit. In this case, the communication networks 2 to 4 are digital communication networks, and the communication network 5 is an analog communication network.

The acquisition section 111 determines the value of the measurement data, every time the measurement data is acquired from a sensor unit 70, after the start of the measurement, and discards the measurement data received from the plurality of sensor units 30 which are connected to the sensor unit 70 and the communication network 3 until a predetermined condition is satisfied.

In addition, in a case where the value of the measurement data from the sensor unit 70 satisfies the predetermined condition (for example, in a case of exceeding a predetermined threshold value), the acquisition section 111 starts storing the measurement data received from the plurality of sensor units 30 and sensor units 70 connected to the communication network 3, in the storage section 12.

Incidentally, the acquisition section 111 is configured to temporarily store the measurement data for a predetermined period before the current time in a memory or the like, and in a case where the value of the measurement data from the sensor unit 70 satisfies the predetermined condition, the acquisition section 111 may store the measurement data for a predetermined period before the current time in the storage section 12. Further, in a case where a predetermined time has elapsed from when the value of the measurement data from the sensor unit 70 satisfies the predetermined condition, the acquisition section 111 may end storing the measurement data received from the plurality of sensor units 30 and sensor units 70 in the storage section 12.

Hitherto, the fifth embodiment of the invention has been described. According to the fifth embodiment, for example, the control device 10 is not required to store all pieces of the received measurement data, after the start of measurement, and it is possible to reduce the storage capacity. Further, it is possible to use the measurement data from a sensor unit on a single sensor network, as a trigger to store the measurement data from a sensor unit on another sensor network. In addition, the measurement data from the sensor unit 70 is not used, but the measurement data from the sensor unit 30 may be used, as a trigger.

Sixth Embodiment

In the second embodiment, the synchronous signal generation unit 40 that transmits the synchronous signal to the plurality of communication networks 3 is provided, but in a sixth embodiment, a synchronous signal generation unit, that transmits a synchronous signal to a communication network 3, and a communication network 5 different from the communication network 3, is provided. The following description will focus on those different from the second embodiment.

Figure 14:
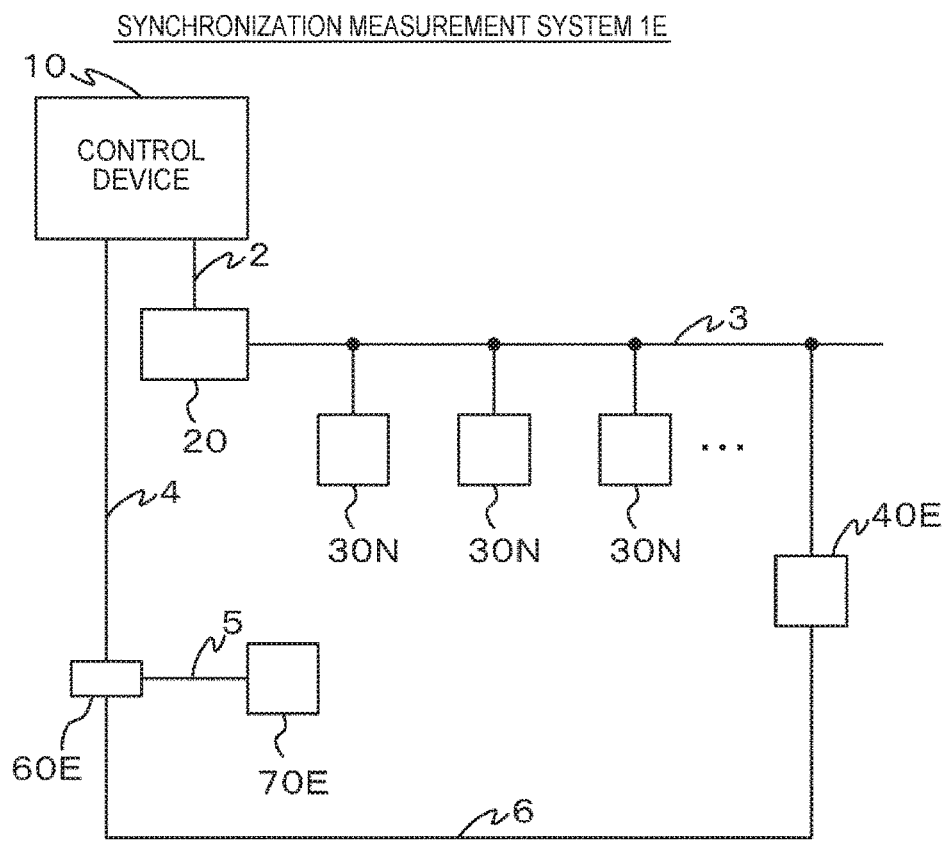
FIG. 14 is a block diagram illustrating an example of a configuration of a synchronization measurement system according to a sixth embodiment of the invention.

FIG. 14 is a block diagram illustrating an example of a configuration of a synchronization measurement system according to a sixth embodiment of the invention.

The synchronization measurement system 1E has the same configuration of the communication network 3 side as that of the synchronization measurement system 1A (FIG. 8). There is a difference in that the control device 10 is connected to the conversion unit 60E through the communication network 4, and communicates with the sensor unit 70E that is connected to the conversion unit 60E through the communication network 5. The sensor unit 70E measures and outputs, for example, predetermined physical quantities. The conversion unit 60E is connected to the communication network 4 and the communication network 5, and, for example, controls the transmission and reception of signals between those communication networks or converts the signals so as to conform to the respective communication standards. Further, the conversion unit 60E is connected to the synchronous signal generation unit 40E, through the communication network 6. The conversion unit 60E controls the transmission and reception of signals between the communication network 5 and the communication network 6, or converts the signals so as to conform to the respective communication standards. In addition, for example, the sensor unit 70E is an analog sensor, and the conversion unit 60 is an analog/digital conversion unit. In this case, the communication networks 2 to 4, and 6 are digital communication networks, and the communication network 5 is an analog communication network.

The synchronous signal generation unit 40E is basically the same as the synchronous signal generation unit 40 (FIG. 8). In other words, the synchronous signal generation unit 40E simultaneously transmits the synchronous signal to the communication network 3 and the communication network 6 at a predetermined timing, through broadcast communication, based on the setting from the control device 10. In addition, any one of the plurality of communication sections 43 is connected to the communication network 6, and transmits and receives information.

The sensor unit 70E monitors the synchronous signal from the communication network 5. In addition, for example, in a case of receiving the synchronous signal, the sensor unit 70E acquires the measurement data (at least the most recent measurement data), and transmits the measurement data to the communication network 5, with the destination as the control device 10.

Hitherto, the sixth embodiment of the invention has been described. According to the sixth embodiment, for example, the synchronous signal generation unit is connected to the plurality of sensor networks, and transmits the synchronous signal to the plurality of sensor networks. Thus, it is possible to easily achieve the synchronization of sensor units on the plurality of sensor networks.

The invention is not limited to the above embodiments, and various modifications can be made within the scope of the spirit of the invention. In addition, it is also possible to combine the respective embodiments described above and respective modification examples as appropriate.

For example, in the first embodiment, the control device 10 may be connected to the plurality of conversion units 20. The conversion unit 20 is connected to at least two or more sensor units 30, respectively. In this case, the control device 10 performs the same process as in the first embodiment, independently for respective sensor networks.

In addition, for example, in the fourth embodiment, the control device 10 may be connected to the plurality of conversion units 20. The conversion unit 20 is connected to at least two or more sensor units 30, respectively. In this case, the control device 10 performs the same process as in the fourth embodiment, independently for respective sensor networks.

In addition, for example, in the fifth embodiment, the control device 10 may be connected to the plurality of conversion units 20. In this case, the conversion unit 20 is connected to at least two or more sensor units 30, respectively. In addition, the control device 10 may be connected to the plurality of conversion units 60. In addition, the plurality of sensor units 70 may be connected to the conversion unit 60.

In addition, for example, in the sixth embodiment, the control device 10 may be connected to the plurality of conversion units 20. In this case, the conversion unit 20 is connected to at least one or more sensor units 30, respectively. In addition, the control device 10 may be connected to the plurality of conversion units 60E. In addition, the plurality of sensor units 70E may be connected to the conversion unit 60E.

Further, for example, in the sixth embodiment, the synchronous signal generation unit 40E may be connected to the communication network 5, without passing through the conversion unit 60E.

In addition, for example, in the sixth embodiment, a single sensor unit 30 of the sensor units 30 on the communication networks 3 is set as a sensor unit 30S, and a synchronous signal transfer unit 50E may be provided instead of the synchronous signal generation unit 40E. In this case, the synchronous signal transfer unit 50E transfers the synchronous signal from the sensor unit 30S to the communication network 6, based on the setting from the control device 10. In addition, the synchronous signal transfer unit 50E may be connected to the communication network 5, without passing through the conversion unit 60E.

In addition, for example, in the first embodiment, the third embodiment, the fourth embodiment, the fifth embodiment, or the sixth embodiment, the setting section 110 may perform setting causing two or three or more of the sensor units 30 on the communication networks 3 is set as a sensor unit 30S to operate as the sensor units 30S. In this case, the transmission frequency of the same synchronous signal may be set, or the transmission frequencies of different synchronous signals may be set, in the respective sensor units 30S. The transmission interval of the same measurement data may be set, or the transmission intervals of different types of measurement data may be set, in the respective sensor units 30. In addition, the acquisition section 111 does not store all pieces of the measurement data transmitted from the sensor unit 30 in the storage section 12, and may store the measurement data at a set timing (for example, discard once at two times).

The measurement data transmitter 311 may distinguish and monitor the synchronous signals from the plurality of sensor units 30S. The measurement data transmitter 311 can distinguish the sensor units 30S using for example, the source ID of the synchronous signal. In this case, the measurement data transmitter 311 determines the transmission cycle based on the synchronous signal, for each of the sensor units 30S. In addition, in a case of transmitting the measurement data, the measurement data transmitter 311 may add an identification code to the measurement data so as to distinguish a sensor unit 30S from which the synchronous signal is transmitted. The acquisition section 111 of the control device 10 distinguishes a sensor unit 30S from which the measurement data is transmitted according to the synchronous signal, based on the identification code.

Here, for example, in a case where the number of sensor units 30S is two, the priority of one of the sensor units 30S is set to be higher. In a first operation mode, the acquisition section 111 stores the measurement data that is transmitted in response to the synchronous signal from the sensor unit 30S having higher priority in the storage section 12, and discards the measurement data that is transmitted in response to the synchronous signal from the sensor unit 30S having lower priority. Meanwhile, in a second operation mode, the acquisition section 111 discards the measurement data that is transmitted in response to the synchronous signal from the sensor unit 30S having higher priority, and stores the measurement data that is transmitted in response to the synchronous signal from the sensor unit 30S having lower priority in the storage section 12. For example, the acquisition section 111 determines whether or not the value of the measurement data satisfies a predetermined condition (for example, whether or not the value exceeds a predetermined threshold value), and in a case where the predetermined condition is satisfied, the acquisition section 111 may perform the switching of the operation mode.

In addition, even in the second embodiment, the setting section 110 may set one or more of the sensor units 30 on the communication networks 3 to operate as the sensor units 30S, in addition to the synchronous signal generation unit 40.

In addition, in the above respective embodiments, various types of information (for example, a setting signal, a synchronous signal, measurement data, and the like) flows over the communication network 3, but for example, various types of information may flow over another communication network 3, depending on the type of information.

Figure 15:
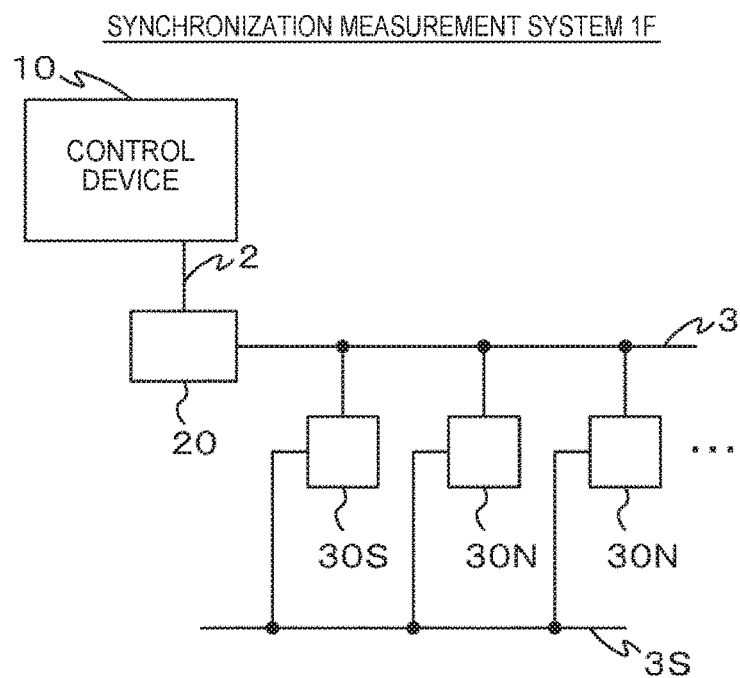
FIG. 15 is a block diagram illustrating an example of a configuration of a synchronization measurement system according to a modification example.

FIG. 15 is a block diagram illustrating an example of a configuration of a synchronization measurement system according to a modification example. A synchronization measurement system 1F is obtained by changing the synchronization measurement system 1 according to the first embodiment (see FIG. 1). In the synchronization measurement system 1F, a communication network 3S for transmitting and receiving a synchronous signal is provided, and each sensor unit 30 is connected to the communication network 3S. Meanwhile, the communication network 3 is used for the information which is transmitted and received between the control device 10 and each sensor unit 30 (for example, a setting signal, measurement data, and the like). In other words, the setting section 110 of the control device 10 transmits the setting signal to each sensor unit 30, through the communication network 3. The synchronous signal transmitter 312 of the sensor unit 30S transmits the synchronous signal to each sensor unit 30N, through the communication network 3S. The measurement data transmitter 311 of each sensor unit 30 transmits the measurement data to the control device 10, through the communication network 3. In addition, the sensor unit 30 is provided with a plurality of communication sections 33 which are connected to the communication network 3 and the communication network 3S. Moreover, the communication network 3S of this modification example corresponds to the first communication path according to the invention, and the communication network 3 of this modification example corresponds to the second communication path according to the invention.

In this way, since the synchronous signal and other types of information (a setting signal, measurement data, and the like) respectively flow through different communication networks, for example, it is possible to reduce the delay of the synchronous signal. Note that this modification is applicable to other embodiments, not only to the first embodiment. For example, in the synchronization measurement system 1A according to the second embodiment, a communication network 3S for transmitting and receiving a synchronous signal is provided, and the respective sensor units 30 and the synchronous signal generation unit 40 are connected to the communication network 3S. Meanwhile, the communication network 3 is used for information (for example, a setting signal, a measurement data, and the like) which is transmitted and received between the control device 10, and each sensor unit 30 and the synchronous signal generation unit 40.

Further, in the above respective embodiments, the communication scheme is exemplified as CAN and CANopen, but is not limited thereto. For example, various communication schemes such as Ethernet (registered trademark), Wi-fi (registered trademark), and Bluetooth (registered trademark) are conceivable.

In addition, in the above respective embodiments, the sensor unit 30 determines the transmission timing of the measurement data based on the synchronous signal, but may determine the timing of the measurement based on the synchronous signal. For example, in a case of determining the transmission cycle of the measurement data based on the transmission intervals of the synchronous signal and the measurement data, the sensor unit 30 performs the measurement by the sensor 34. In this case, the transmission of measurement data may be performed at a timing of the execution of the measurement, or in an asynchronous timing of the timing of the execution of the measurement.

In addition, the configuration of the synchronization measurement system 1 illustrated in FIG. 2, the configuration of the synchronous signal generation unit 40 illustrated in FIG. 9, and the configuration of the synchronous signal transfer unit 50 illustrated in FIG. 11 are classified according to the main processing contents, in order to facilitate the understanding the configuration of a system or a unit. The invention is not limited by the methods of classification or the names of components. The configuration of the system or the unit can be classified into more components, depending on the processing contents. It is also possible to classify one component to perform more processes. Furthermore, the process of each component may be performed by single hardware, or may be performed by the plurality of pieces of hardware. Further, the sharing of the process or function of each component is not limited to those described above, as long as it is possible to achieve the purpose and effect of the invention.

Further, the processing units in the flowchart illustrated in FIGS. 3 to 6 are classified according to the main processing contents, in order to facilitate the understanding the process of the control device 10 or the sensor unit 30. The invention is not limited by the methods of classification or the names of processing units. The process of the control device 10 or the sensor unit 30 can be classified into more processing units, depending on the processing contents. It is also possible to classify one processing unit to include more processes. In addition, the processing order of the flowchart is not limited to the illustrated example, as long as the purpose and the effect of the invention can be achieved.

The entire disclosure of Japanese Patent Application No. 2015-094662, filed May 7, 2015 is expressly incorporated by reference herein.

What is claimed is:

1. A synchronization measurement system comprising:
a controller which is connected to a first network; and
a first plurality of sensor units of which is connected to the first network and is provided with a first synchronous signal transmitter, the first plurality of sensor units including first and second sensor units,
wherein the controller includes an acquisition section that receives a first plurality of identifiers transmitted by the first plurality of sensor units,
the controller includes a setting section that selects, based on the first plurality of identifiers, at least one of the first plurality of sensor units as a first node which transmits a first synchronous signal to the first network, and the first node includes the first sensor unit,
wherein the setting section selects the second sensor unit of the first plurality of sensor units as a second node that is configured to perform measurement of measurement data, based on the first synchronous signal received from the first network, the second sensor unit is not set as the first node, among the first plurality of sensor units,
wherein the setting section transmits measurement timing information to the second node,
wherein the measurement timing information is a frequency division ratio for a transmission frequency of the first synchronous signal, and
wherein the second node performs the measurement, or transmits the measurement data, based on the first synchronous signal, the measurement timing information, a number of receptions of the first synchronous signal, and the frequency division ratio.

2. The synchronization measurement system according to claim 1,
wherein the second node transmits the measurement data to the controller.

3. The synchronization measurement system according to claim 1,
wherein the controller includes a selection unit that selects the transmission frequency of the first synchronous signal, and
wherein the setting section sets the transmission frequency of the first synchronous signal that is selected by the selection unit, in the first node.

4. The synchronization measurement system according to claim 1, further comprising:
a second plurality of sensor units of which is connected to a second network and is provided with a second synchronous signal transmitter,
wherein the acquisition section receives a second plurality of identifiers transmitted by the second plurality of sensor units, wherein the controller is connected to the second network, and wherein the setting section selects, based on the second plurality of identifiers, at least one of the second plurality of sensor units that are connected to the second network as the first node which transmits a second synchronous signal to the second network.

5. The synchronization measurement system according to claim 1, further comprising:

a synchronous signal generation unit that is connected to the first network and a second network; and a second plurality of sensor units of which is connected to the second network and is provided with a second synchronous signal transmitter, wherein the controller is connected to the second network, and wherein the setting section sets the synchronous signal generation unit, as the first node that is common to the first network and the second network, in a case where the controller is connected to the first network and the second network, and detects the synchronous signal generation unit capable of transmitting the first synchronous signal to the first network and the second network.

6. The synchronization measurement system according to claim 1, further comprising:

a second plurality of sensor units of which is connected to a second network and is provided with a second synchronous signal transmitter; and a synchronous signal transfer unit that is connected to the first network and the second network, wherein the controller is connected to the second network, and wherein the synchronous signal transfer unit transfers the first synchronous signal which is received from the first network to the second network.

7. The synchronization measurement system according to claim 1, wherein the controller discards the measurement data from the first plurality of sensor units until the measurement data from any one of the first plurality of sensor units satisfies a predetermined condition.

8. The synchronization measurement system according to claim 1, further comprising:

a second plurality of sensor units of which is connected to a second network and is provided with a second synchronous signal transmitter, wherein the controller is connected to the second network, and discards the measurement data from the second plurality of sensor units, until the measurement data from any one of the first plurality of sensor units connected to the first network and any one of the second plurality of sensor units connected to the second network satisfies a predetermined condition.

9. The synchronization measurement system according to claim 5, wherein the first network is a digital communication network, and wherein the second network is an analog communication network.

10. The synchronization measurement system according to claim 1, wherein the first network includes a first communication path and a second communication path, wherein the first node transmits the first synchronous signal to the second node through the first communication path, and wherein the second node transmits the measurement data to the controller through the second communication path.

11. The synchronization measurement system according to claim 10, wherein the setting section transmits a setting signal for selecting the at least one of the first plurality of sensor units as the first node, to the first sensor unit, through the second communication path.

12. A synchronization measurement method of a synchronization measurement system including a controller which is connected to a first network, and a plurality of sensor units of which is connected to the first network and is provided with a synchronous signal transmitter, the synchronization measurement method causing the controller to:

receive a plurality of identifiers transmitted by the plurality of sensor units, the plurality of sensor units including first and second sensor units;

select at least one of the plurality of sensor units as a first node which transmits a synchronous signal to the first network based on the plurality of identifiers, the first node including the first sensor unit;

select the second sensor unit of the plurality of sensor units as a second node that is configured to perform measurement of measurement data, based on the synchronous signal received from the first network, the second sensor unit is not set as the first node, among the plurality of sensor units;

transmit measurement timing information to the second node; and receive measurement data, based on the synchronous signal and the measurement timing information, wherein the measurement timing information is a frequency division ratio for a transmission frequency of the synchronous signal, and wherein the second node performs the measurement, or transmits the measurement data, based on the synchronous signal, the measurement timing information, a number of receptions of the synchronous signal, and the frequency division ratio.

13. A controller in a synchronization measurement system, the controller being connected to a first network, the controller comprising:

an acquisition section that receives a plurality of identifiers transmitted by a plurality of sensor units including first and second sensor units; and a setting section that selects at least one of the plurality of sensor units of which is connected to the first network and is provided with a synchronous signal transmitter based on the plurality of identifiers, as a first node which transmits a synchronous signal to the first network, wherein the setting section selects the second sensor unit of the plurality of sensor units as a second node that is configured to perform measurement of measurement data, based on the synchronous signal received from the first network, the second sensor unit is not set as the first node, among the plurality of sensor units, wherein the setting section transmits measurement timing information to the second node, wherein the measurement timing information is a frequency division ratio for a transmission frequency of the synchronous signal, and wherein the second node performs the measurement, or transmits the measurement data, based on the synchronous signal, the measurement timing information, a number of receptions of the synchronous signal, and the frequency division ratio.

14. A computer program product of a controller for use in a synchronization measurement system, the computer program product encoded on a non-transitory computer-readable storage medium storing instructions that when executed by a processor of the controller cause the processor to perform steps comprising:
receiving a plurality of identifiers transmitted by a plurality of sensor units of which is connected to a first network and is provided with a synchronous signal transmitter, the plurality of sensor units including first and second sensor units;
selecting at least one of the plurality of sensor units, based on the plurality of identifiers, as a first node which transmits a synchronous signal to the first network, the first node including the first sensor unit;
selecting the second sensor unit of the plurality of sensor units as a second node that is configured to perform measurement of measurement data, based on the synchronous signal received from the first network, the second sensor unit is not set as the first node, among the plurality of sensor units; and
transmitting measurement timing information to the second node,
wherein the controller is connected to the first network,
wherein the measurement timing information is a frequency division ratio for a transmission frequency of the synchronous signal, and
wherein the second node performs the measurement, or transmits the measurement data, based on the synchronous signal, the measurement timing information, a number of receptions of the synchronous signal, and the frequency division ratio.

15. A sensor unit in a synchronization measurement system, the sensor unit comprising:
a plurality of sensors including first and second sensors, each of the plurality of sensors being configured to measure data, wherein the data corresponds to a predetermined physical quantity;
a storage section that stores the measured data;
a communication section that:
receives measurement timing information through a first network;
transmits an identifier of the sensor unit; and
a controller that includes a setting section, a measurement data transmitter, and a synchronous signal transmitter,
wherein the setting section selectively enables and disables the measurement data transmitter and the synchronous signal transmitter based on the identifier of the sensor unit,
wherein the synchronous signal transmitter transmits a synchronous signal to the plurality of sensors including first and second sensors, through the communication section, in response to (i) being selected as a first node including the first sensor, by the controller, based on the identifier and (ii) being enabled by the setting section,
wherein the setting section selects the second sensor of the plurality of sensors as a second node that is configured to perform measurement of measurement data, based on the synchronous signal received from the synchronous signal transmitter, the second sensor unit is not set as the first node, among the plurality of sensors,
wherein the setting section transmits the measurement timing information to the second node,
wherein the measurement data transmitter receives the synchronous signal, through the communication section, from the first node in response to not being selected as the first node by the controller,
wherein the measurement timing information is a frequency division ratio for a transmission frequency of the synchronous signal, and
wherein the second node performs the measurement, or transmits the measurement data through the communication section, based on the synchronous signal, the measurement timing information, a number of receptions of the synchronous signal, and the frequency division ratio.

* * * * *